United States Patent [19]

Crawford et al.

[11] 3,902,915

[45] Sept. 2, 1975

[54] DISPERSIBLE SILICA PIGMENT

[75] Inventors: Roger A. Crawford, Wadsworth; Robert H. Walsh, Akron, both of Ohio

[73] Assignee: PPG Industries, Inc., Pittsburgh, Pa.

[22] Filed: June 30, 1972

[21] Appl. No.: 267,783

[52] U.S. Cl. .......................... 106/288 B; 106/308 N
[51] Int. Cl. ......................... C08h 17/02; C09c 1/28
[58] Field of Search ............. 106/288 B, 309, 308 N

[56] References Cited
UNITED STATES PATENTS

| | | | |
|---|---|---|---|
| 2,578,605 | 12/1951 | Sears et al. | 106/308 N |
| 2,663,650 | 12/1953 | Iler | 106/308 N |
| 2,865,777 | 12/1958 | Allen | 106/288 B |
| 2,924,510 | 2/1960 | Allen | 423/335 |
| 3,597,253 | 8/1971 | Beschke | 106/288 B |
| 3,627,724 | 12/1971 | Lambert | 106/308 N |
| 3,629,139 | 12/1971 | Vossos | 106/308 N |
| 3,656,981 | 4/1972 | Beschke et al. | 106/288 B |
| 3,709,980 | 1/1973 | Chisholm | 423/339 |
| 3,787,221 | 1/1974 | Topcik | 106/288 B |

*Primary Examiner*—Delbert E. Gantz
*Assistant Examiner*—James W. Hellwege
*Attorney, Agent, or Firm*—Irwin M. Stein

[57] ABSTRACT

Readily dispersible pelletized silica, useful as rubber and paper pigments are provided by treating an aqueous silica slurry having a solids content less than about 25 percent by weight, with a minor amount of a surface active agent, preferably a cationic dialkyl dimethyl ammonium chloride followed by simultaneously pelletizing and drying the silica in a moving bed.

21 Claims, No Drawings

DISPERSIBLE SILICA PIGMENT

This invention relates to a method for preparing siliceous pelletized pigments particularly useful for reinforcing rubber compounds and as a paper filler or coating agent.

More particularly, the invention relates to a method for preparing siliceous (alternatively referred to herein as silica) pigment pellets from a slurry of sodium silicate prepared by the acidification of an alkali metal silicate.

The method of preparing silica pigments is well known. A reference which quite completely describes the preparation of alkali metal silicates and particularly sodium silicate is Thornhill, U.S. Pat. No. 2,940,830. Briefly, the process comprises forming an aqueous slurry of sodium silicate having an $Na_2O(SiO_2)$ ratio of 1:3.3 and neutralizing with an acidification agent such as carbon dioxide to form a sodium silicate polymer (precipitated silica) having a $SiO_2$ content of about 87 percent. Because the sodium silicate polymer (precipitated silica) results in a viscous reaction medium, generally dilute alkali metal silicate is employed so that the solids content does not become so high as to form a paste, i.e., not more than about 20 percent and preferably between about 1 and about 12 percent solids. Thus, sufficiently dilute sodium silicate is employed so that when acidification is substantially complete, the reaction medium has the consistency of a slurry. After the acidification or neutralization is complete, the precipitated silica is recovered by filtration and then dried by conventional means such as in a rotary or tray dryer to a constant weight. If a pellet is not desired, the product is also milled to obtain a finely-divided product. When a pellet is desired, it is generally formed so as to have an aggregate size between about 250 and 6700 microns. Unfortunately to Applicants' knowledge, it has not been previously possible to prepare pelletized pigments having the same dispersion efficiency as mechanically milled siliceous pigment such as is commercially available having an aggregate size less than about 44 microns. This difficulty is particularly pronounced when the silica is dried in a rotary dryer in that the rapid drying and tumbling apparently contributes to a closely bound pigment which is not easily dispersed when formulated into a rubber compound.

One method to overcome this problem has been suggested by Topcik, U.S. Pat. No. 3,646,183, wherein it is taught that a dry free-flowing pellet of precipitated silica can be obtained if the silica after drying is then formed into a concentrated paste of between about 29 and 40 percent solids content, a surface active agent added thereto, and then the paste dried to form pellets. It is also suggested by the patentee, that in lieu of completely drying before adding the surface active agent, that the surface active agent can be added during the silica manufacturing process after washing and partially de-watering of the precipitate. It is stated, however, that the pellet should be dried by a static bed method such as tray drying since moving bed techniques such as exist in a rotary dryer cause the pellet to be destroyed.

It has now been discovered that the surface active agent can be added to a slurry of precipitated silicate after flocculation but before the final washing, filtration, or drying, when the solids content is less than about 20 percent and even as low as about 1 percent and that the surface active agent will not be substantially removed or rendered inactive in the subsequent treatment. Further, it has been discovered that the surface active agent treated silica can be dried in moving bed techniques such as exist in a rotary dryer and that the resultant pellet is readily dispersible. Consequently, pellets can be produced without any special conditions over what is commonly being employed in the commercial preparation of silica.

Surface active agents which can be employed include all three of the known types including cationic, non-ionic, and anionic. The preferred surface active agents are the cationic and particularly the quaternary ammonium salts such as the dialkyl quaternary ammonium chlorides. The cationic surface active agents are preferred because they are effective in lower concentrations. Anionic surface active agents which have been employed include: the sodium salt of polyacrylic acid and the sodium salt of alkyl dithiophosphoric acid. Non-ionic surface active agents which have been employed include polyethylene glycol esters of oleic, lauric and stearic acids. Cationic surface active agents which have been employed include dialkyl dimethyl ammonium chloride in which the alkyl groups are principally dodecyl (47 percent), and tetradecyl (18 percent), and a dialkyl dimethyl ammonium chloride wherein the alkyl groups comprise 75 percent octadecyl, 24 percent hexadecyl, and 1 percent octadecenyl.

The preferred cationic surface active agents are the alkyl trimethyl ammonium chlorides and the dialkyl dimethyl ammonium chlorides in which the alkyl groups contain principally 8 to 18 carbon atoms.

The amount of surface active agent added will depend upon the particular surface active agent and where in the process it is added. For example, precipitated silica is generally passed through a series of settling and filtration tanks such as depicted by Allen in U.S. Pat. No. 2,924,510. Allen teaches the use of Applicants' preferred surface active agents for use as a flocculent and they are added to the reactor prior to passing the slurry to the three Dorr tanks. Thus, if the surface active agent is added at an early stage in the manufacturing process such as suggested by Allen, sufficient amount must be added so that the final dried pigment has a content of at least about 0.3 percent by weight of $SiO_2$ in order to obtain a dispersible pigment. Thus, the amount which Allen states is present on the final dry product of 0.12 percent ammonium salt by weight of $SiO_2$, is insufficient to provide a dispersible pellet although it is sufficient to flocculate the precipitated silica. Accordingly, in order to be most effective and permit the employment of the smallest amount of surface active agent, it is preferred that the surface active agent be added near the end of the process such as in Dorr tank No. 3 depicted in the drawing of Allen. This will also obviate another problem in that large amounts of surface active agents such as between about 0.5 and about 1 percent may cause foaming in the tank. If it is desired to use the surface active agent as both a flocculent and a pelletizing agent, then a small amount of surface active agent should be added early in the manufacturing process such as in a storage tank after reaction or in a settling tank such as Dorr tank No. 1 depicted in the drawing of Allen, in an amount from between about 0.1 and about 0.2 percent, and a second addition made late in the process after settling and washing in an amount of at least about 0.3 and preferably between about 0.5 and about 1 percent.

The following example will serve to illustrate the invention and its preferred embodiments. All parts and percentage in said example are by weight unless otherwise indicated.

EXAMPLE I

Precipitated silica prepared by the general method of Allen, U.S. Pat. No. 2,924,510 except that a 0.1 percent dialkyl dimethyl ammonium chloride wherein the alkyl groups comprise 75 percent octadecyl, 24 percent hexadecyl, and 1 percent octadecenyl, was added to Dorr tank No. 1, said precipitated silica having a solids content of between 3 and 5 percent and containing 95 percent $SiO_2$ was screened through a −100 mesh U.S. Screen (149 microns) and the −100 mesh fraction mixed with an aqueous solution of surface active agent and the resultant slurry filtered on a Buchner filter. The residence time in the filter funnel was 10 to 15 minutes. The wet cake was then dried in a rotary dryer at 120°–140°C. for about 90 minutes until substantially all of the free water was removed. The resultant pellets having a predominant aggregate size of about 250–6700 microns were then compounded into a standard rubber formulation (infra) and the visible specks were counted both by the naked eye and by the use of a lens having a magnification power of 10. The particular surface active agent, its weight percent, and the dispersion rating for the rubbers are shown in Table 1. With regard to the dispersion rating, the first letter indicates the large particle sizes, whereas the second letter indicates very small particles. Likewise, when two numerals are given, the second numeral indicates the smaller particle sizes. Only the larger specks are objectionable. The Code is as follows with the letters indicating the visible specks and the numbers indicating the specks under magnification:

A = 0
B = 1–3
C = 4–10
D = Greater than 10;
1 = 0
2 = 1–5
3 = 6–10
4 = 11–30
5 = Greater than 30.

The rubber formulation employed is as follows: 100 parts of an isobutylene-isoprene elastomer and 5 parts of a red iron oxide master batch comprising 75 percent iron oxide and 25 percent of the aforesaid elastomer were blended in a Banbury at 260°–300°F. with water cooling on full for 1 minute whereupon 25 parts of the surface active treated siliceous pigment was added. After an additional 5 minutes, 25 more parts of surface active treated siliceous pigment was added along with 5 parts of tributoxyethylphosphate and the mixing continued for an additional 5 minutes. The rubber was then removed from the Banbury and banded on a rubber mill to a quarter inch thickness at about 110°–120°F. in less than a minute. The rubber was cooled to room temperature and cut into two sections 2 × 10 inches and the silica particles counted on all four surfaces. The lowest number of specks is preferred as this indicates that the siliceous pigment is dispersed in the rubber which provides the maximum reinforcement to the rubber.

TABLE 1

| Example Number | Weight Percent Surface Active Agent | Surface Active Agent | Dispersion Rating |
| --- | --- | --- | --- |
| 1 | None | None | D/5 |
| 2 | 0.3 | Polyethylene glycol monooleate (400 MW) (nonionic) | D/5 |
| 3 | 0.6 | Polyethylene glycol monooleate (400 MW) (nonionic) | C, D/5 |
| 4 | 1.0 | Polyethylene glycol monooleate (400 MW) (nonionic) | B, C/4,5 |
| 5 | None | None | C, D/5 |
| 6 | 0.5 | Sodium salt of polyacrylic acid (anionic) | B, D/5 |
| 7 | 0.5 | Dialkyl dimethyl ammonium chloride (alkyl is 75% octadecyl, 24% hexadecyl, and 1% octadecenyl) (cationic) | A, D/5 |

Although the present invention has been described with reference to the specific details of particular embodiments thereof, it is not intended to limit the scope of the invention, except insofar as the specific details are recited in the appended claims.

We claim:

1. In the process of preparing precipitated silica pigment pellets wherein an aqueous alkali metal silicate solution is acidified with acidifying agent to form an aqueous slurry of precipitated silica having a solids content of between about 1 and about 12 percent, thus precipitated silica is flocculated, the flocculated silica is settled, and settled silica is recovered and dried, thereby forming pellets of precipitated silica pigment, the improvement which comprises preparing precipitated silica pigment pellets of improved rubber dispersibility by adding surface active agent to a slurry of settled silica before it has been recovered in an amount sufficient to provide between about 0.5 and about 1 weight percent of surface active agent on the dried silica pellet, said slurry of settled silica having a solids content of between 1 and 12 percent, recovering said settled silica and simultaneously pelletizing and drying the silica in a moving bed until substantially all of its free water has been removed, and recovering silica pellets having a predominant aggregate size of between 250 and 6,700 microns which are readily dispersible in rubber.

2. The process of claim 1 wherein the slurry of settled silica to which surface active agent is added has a solids content of between 3 and 5 weight percent.

3. The process of claim 1 wherein the alkali metal silicate is sodium silicate.

4. The process of claim 1 wherein the surface active agent is a cationic surface active agent.

5. The process of claim 1 wherein from 0.3 to 1 percent of cationic surface active agent is used.

6. The process of claim 4 wherein the surface active agent is quaternary ammonium salt.

7. The process of claim 6 wherein the quaternary ammonium salt is dialkyl quaternary ammonium salts wherein the alkyl groups contain from 8 to 18 carbon atoms.

8. The process of claim 7 wherein the quaternary ammonium salt is dialkyl dimethyl ammonium chloride or alkyl trimethyl ammonium chloride.

9. The process of claim 1 wherein the settled silica to which surface active agent is added is a −100 mesh fraction.

10. In the process of preparing precipitated silica pigment pellets wherein an aqueous sodium silicate solution is acidified with acidifying agent to form an aqueous slurry of precipitated silica having a solids content of between about 1 and about 12 percent, thus precipitated silica is flocculated, the flocculated silica is settled and settled silica is recovered and dried, thereby forming pellets of precipitated silica pigment, the improvement which comprises preparing precipitated silica pigment pellets of improved rubber dispersibility by treating a slurry of settled silica before it has been recovered with at least 0.3 weight percent of cationic surface active agent, based on the settled silica solids, said slurry of settled silica having a solids content of between 1 and 12 percent, recovering thus treated settled silica, simultaneously pelletizing and drying thus recovered silica in a moving bed until substantially all of its free water has been removed and recovering dried pelletized silica that is readily dispersible in rubber, that has a predominant aggregate size of between 250 and 6,700 microns and that contains between about 0.5 and about 1 weight percent of surface active agent.

11. The process of claim 10 wherein the surface active agent is dialkyl ammonium salt wherein the alkyl groups contain from 8 to 18 carbon atoms.

12. The process of claim 11 wherein the quaternary ammonium salt is dialkyl dimethyl ammonium chloride or alkyl trimethyl ammonium chloride.

13. The process of claim 10 wherein the acidifying agent is carbon dioxide.

14. The process of claim 10 wherein the precipitated silica is flocculated by the addition of from 0.1 to about 0.2 weight percent of surface active agent and the settled silica is recovered by filtration.

15. The process of claim 10 wherein the settled silica treated with cationic surface active agent is a −100 mesh fraction.

16. The process of claim 15 wherein the acidifying agent is carbon dioxide.

17. In the process of preparing precipitated silica pigment pellets wherein an aqueous sodium silicate solution is acidified with carbon dioxide to form an aqueous slurry of precipitated silica having a solids content of between about 1 and about 12 percent, thus precipitated silica is flocculated, the flocculated silica is settled and settled silica is recovered and dried, thereby forming pellets of precipitated silica pigment, the improvement which comprises preparing precipitated silica pigment pellets of improved rubber dispersibility by treating a slurry of precipitated silica with surface active agent to flocculate the precipitated silica, treating a slurry of settled silica with at least 0.3 weight percent of dialkyl ammonium salt surface active agent, based on settled silica solids, wherein the alkyl groups of the dialkyl ammonium salt contain from 8 to 18 carbon atoms, said slurry of settled silica having a solids content of between 1 and 12 percent, recovering thus treated settled silica by filtration, simultaneously pelletizing and drying thus recovered silica in a moving bed until substantially all of its free water has been removed and recovering dried pelletized silica that is readily dispersible in rubber, that has a predominant aggregate size of between 250 and 6,700 microns and that contains between about 0.5 and about 1 weight percent of surface active agent.

18. The process of claim 17 wherein the settled silica treated with dialkyl ammonium salt is a −100 mesh fraction.

19. The process of claim 17 wherein the precipitated silica is flocculated by treatment with from 0.1 to 0.2 weight percent of cationic surface active agent.

20. The process of claim 10 wherein the slurry of settled silica treated with cationic surface active agent has a solids content of between 3 and 5 weight percent.

21. The process of claim 18 wherein the slurry of settled silica treated with dialkyl ammonium salt surface active agent has a solids content of between 3 and 5 weight percent.

* * * * *